(12) United States Patent
Martino et al.

(10) Patent No.: US 7,797,345 B1
(45) Date of Patent: Sep. 14, 2010

(54) RESTRICTING HIERARCHICAL POSTS WITH SOCIAL NETWORK METRICS METHODS AND APPARATUS

(75) Inventors: Paul J. Martino, Mountain View, CA (US); Mark Pincus, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 333 days.

(21) Appl. No.: 11/102,565

(22) Filed: Apr. 7, 2005

Related U.S. Application Data

(60) Provisional application No. 60/560,414, filed on Apr. 7, 2004.

(51) Int. Cl.
*G06F 17/30* (2006.01)
(52) U.S. Cl. .................................. 707/792
(58) Field of Classification Search ............ 707/104.1, 707/1, 10
See application file for complete search history.

(56) References Cited

U.S. PATENT DOCUMENTS

| | | | |
|---|---|---|---|
| 6,112,181 A | 8/2000 | Shear et al. | |
| 6,134,566 A | 10/2000 | Berman et al. | |
| 6,175,831 B1 | 1/2001 | Weinreich et al. | |
| 6,295,526 B1 | 9/2001 | Kreiner et al. | |
| 6,622,147 B1* | 9/2003 | Smiga et al. | 707/102 |
| 6,745,196 B1 | 6/2004 | Colyer | |
| 6,868,389 B1* | 3/2005 | Wilkins et al. | 705/10 |
| 7,069,308 B2 | 6/2006 | Abrams | |
| 7,113,917 B2 | 9/2006 | Jacobi et al. | |
| 7,167,910 B2 | 1/2007 | Farnham | |
| 7,177,880 B2 | 2/2007 | Ruvolo et al. | |
| 7,275,102 B2 | 9/2007 | Yeager et al. | |
| 7,289,965 B1 | 10/2007 | Bradley et al. | |
| 7,318,037 B2 | 1/2008 | Solari | |
| 2001/0014868 A1* | 8/2001 | Herz et al. | 705/14 |
| 2002/0138289 A1 | 9/2002 | Thielges et al. | |
| 2002/0178161 A1 | 11/2002 | Brezin et al. | |
| 2003/0050977 A1 | 3/2003 | Puthenkulam et al. | |
| 2003/0158855 A1 | 8/2003 | Farnham et al. | |
| 2003/0167324 A1 | 9/2003 | Farnham et al. | |
| 2003/0200112 A1 | 10/2003 | Royall et al. | |
| 2003/0216986 A1* | 11/2003 | Hassan | 705/35 |

(Continued)

FOREIGN PATENT DOCUMENTS

EP 1288795 A1 3/2003

OTHER PUBLICATIONS

Balabanović et al., "Content-Based, Collaborative Recommendation," Mar. 1999, ACM, vol. 40, No. 3, pp. 66-72.

(Continued)

*Primary Examiner*—Diane Mizrahi
(74) *Attorney, Agent, or Firm*—Patent Capital Group

(57) ABSTRACT

A method for a computer system includes receiving a listing from a first user, determining a first plurality of social network relationship factors for the first user with respect to a first plurality of users, determining a second plurality of users from the first plurality of users who fulfill a filtering criteria, wherein a third plurality of users from the first plurality of users do not fulfill the filtering criteria, and making the listing available to users from the second plurality of users but not the third plurality of users, and providing the listing to a second user from the second plurality of users.

17 Claims, 5 Drawing Sheets

U.S. PATENT DOCUMENTS

| | | | |
|---|---|---|---|
| 2004/0167794 A1* | 8/2004 | Shostack et al. | 705/1 |
| 2005/0021750 A1 | 1/2005 | Abrams | |
| 2005/0131884 A1 | 6/2005 | Gross et al. | |
| 2005/0210102 A1* | 9/2005 | Johnson et al. | 709/204 |
| 2005/0256866 A1 | 11/2005 | Lu et al. | |
| 2006/0167864 A1 | 7/2006 | Bailey et al. | |
| 2007/0088614 A1* | 4/2007 | Huo | 705/26 |

OTHER PUBLICATIONS

Kautz et al., Combining Social Networks and Collaborative Filtering, Mar. 1997, vol. 40, No. 3, pp. 63-65.

Schafer et al., "Recommender Systems in E-Commerce," 1999, ACM, Proceedings of the 1st ACM conference on Electronic Commerce pp. 158-166.

Kautz et al., "Combining Social Networks and Collaborative Filtering," Mar. 1997, vol. 40, No. 3, pp. 63-65.

Schafer et al., "Recommender systems in E-Commerce," 1999, ACM, Proceedings of the 1st ACM conference on Electronic Commerce, pp. 158-166.

U.S. Appl. No. 11/102,572, filed Apr. 7, 2005, entitled "Hierarchical Posting Systems and Methods with Social Network Filtering," Inventor(s) Paul J. Martino, et al.

U.S. Appl. No. 11/102,573, filed Apr. 7, 2005, entitled "Methods and Apparatus for Integrating Social Network Metrics and Reputation Data," Inventor(s) Brian Lawler, et al.

U.S. Appl. No. 11/123,854, filed May 6, 2005, entitled "Dynamic Social Network Relationship Determination Method and Apparatus," Inventor(s) Paul J. Martino, et al.

U.S. Appl. No. 11/123,853, filed May 5, 2005, entitled "Methods and Apparatus for Determining Social Relevance in Near Constant Time," Inventor(s) Paul J. Martino, et al.

U.S. Appl. No. 11/123,844, filed May 6, 2005, entitled "Methods and Apparatus for Redetermining Social Maps Upon Expectation of Change," Inventor(s) Paul J. Martino, et al.

U.S. Appl. No. 11/221,573, filed Sep. 7, 2005, entitled "Dynamic Social Network Relationship Determination Methods and Apparatus," Inventor(s) Paul J. Martino, et al.

U.S. Appl. No. 11/102,569, filed Apr. 7, 2005, entitled "Communication Systems and Methods with Social Network Filtering," Inventor(s) Brian Lawler, et al.

U.S. Appl. No. 11/222,685, filed Sep. 8, 2005, entitled "Social Network Augmentation of Search Results Methods and Apparatus," Inventor(s) Brian Lawler, et al.

U.S. Appl. No. 11/223,452, filed Sep. 8, 2005, entitled "Social Network Filtering of Search Results Methods and Apparatus," Inventor(s) Brian Lawler, et al.

U.S. Appl. No. 11/123,852, filed Apr. 7, 2005, entitled "Methods and Apparatus for Targeting communications Using Social network Metrics," Inventor(s) Brian Lawler, et al.

Fahl, Gustov and Tore Risch, "Query processing over object views of relational data," The VLDB Journal 6 (1997), pp. 261-281.

Brio Technology; Secure Business Intelligence with Brio Enterprise Meeting user's needs for flexible data access, while providing robust security with Brio Enterprise 5.5. http://www.gtech.com.tr/Kutuphane/Secure_Business_Intelligence_with_Brio_Enterprises.pdf, Nov. 1998, Oct. 16, 2008.

\* cited by examiner

RESTRICTING HIERARCHICAL POSTS WITH SOCIAL NETWORK METRICS METHODS AND APPARATUS

CROSS REFERENCE TO RELATED APPLICATIONS

The present invention claims priority to Provisional Application No. 60/560,414 filed Apr. 7, 2004 and incorporates it by reference for all purposes. The present invention also incorporates by reference, for all purposes Provisional Application No. 60/560,468 filed Apr. 7, 2004 and Provisional Application No. 60/570,911 filed May 12, 2004.

BACKGROUND OF THE INVENTION

The present invention relates to trust-metric networks. More specifically, the present invention relates to methods and apparatus for using trust relationships within social networks to organize hierarchical posts such as classified listings.

The term "classified listings" has typically been associated with pages and pages of tiny print in newspapers. These listings include help wanted listings, items for sale, wanted items, houses and apartments for rent, services offered, and the like. Many such listings are posted by individuals, companies, groups, etc.

Typical problems with the traditional classified listings includes that if a buyer is looking for something in particular, the buyer must constantly devote time pouring over pages and pages of classified listings. Another problem is that if a listing is misclassified, buyers may not see them. Yet another problem is that classified listings often continue to run, even after the item is sold, for example. Additional problems will be discussed below.

With the advent of wide area computer networks, such as the Internet, attempts have been made to bring classified listings on-line. One advantage to on-line classified listings over paper-based listings is that buyers are often provided with key-word searching capability to locate potentially relevant classified listings. Another advantage is that when an item is sold, for example, the advertisement can be promptly removed from the classified listings.

Drawbacks to on-line classified listings include that buyers or sellers are often wary of each other. Except for an e-mail address, it is often difficult for buyers or sellers to judge whether the other party is "legitimate." For example, when buying an expensive item such as a Rolex Daytona watch via a classified listing, buyers are concerned whether the watch is genuine, whether the watch works, whether they will actually get the watch if they send a payment, or the like. This is especially relevant when the seller is an individual. When the seller is a business, for example, buyers may have a little more sense of confidence. These drawbacks also apply to traditional classified listings.

Examples of on-line classified listings services includes e-commerce based web sites, such as shopping.yahoo.com, froogle.com, amazon.com, ebay.com, overstock.com, epinions.com and the like. In such services, a rating system is typically provided for both the seller and the buyer to rate each other. The rating system thus provides subsequent buyers and sellers some indication of the reputation of the respective sellers or buyers, or how happy they were with the transaction.

Problems with the rating systems include the use of "shill" buyers or sellers, who rate transactions highly, although no actual transaction took place. Such shills are typically related to or work for the rated party. Because of such shills, the ratings of buyers or sellers reported on various web sites may not be reliable.

Another problem with the rating system is that it inherently favors volume buyers or sellers (e.g. businesses) over individuals. For example, all things being equal, a buyer would probably buy from a business seller with 500 ratings that are good rather than an individual seller with only one rating, an excellent rating.

Very similar issues also apply to users who post classified listings. For example, is the buyer trustworthy, will the buyer pay, is the buyer's rating accurate, and the like.

Accordingly, in light of the above, what is desired are methods and apparatus that provide classified listings without the drawbacks to individuals, as discussed above.

BRIEF SUMMARY OF THE INVENTION

The present invention relates to methods and apparatus for using trust-metrics in a trust-metric network to organize classified listings. With embodiments of the present invention, trust relationships between users in trust-metric networks, such as social networks, are used to help specify the reach of classified listings in the network as well as to help users manage or prioritize which the classified listings are viewed.

According to one aspect of the invention, a hierarchal posting method is disclosed. On technique includes determining a plurality of social network relationships for a first user within a social network, and receiving a hierarchal listing from the first user. The process may also include determining which users in the social network can view the hierarchal listing in response to the plurality of social network relationships for the first user.

According to another aspect of the invention, a computer system is disclosed. One apparatus includes a plurality of social network relationships for a first user. The system may also include a processor configured to receive a hierarchal listing from the first user, and configured to determine which users in the social network can view the hierarchal listing in response to the plurality of social network relationships for the first user.

According to yet another aspect of the invention, a computer program product is disclosed. One computer program product may include code that directs the processor to receive a plurality of social network relationships for a first user, and code that directs the processor to receive a hierarchal listing from the first user. Additionally, a computer program product may include code that directs the processor to determine a subset of users in the social network can view the hierarchal listing in response to the plurality of social network relationships for the first user, and code that directs the processor to provide the hierarchal listing to the subset of users. The codes may be machine readable or human readable. The codes may reside on a tangible media such as a optical media (e.g. CD, DVD), magnetic media (e.g. hard disk), semiconductor media (e.g. RAM), or the like.

According to another aspect of the invention, a method for a computer system is disclosed. One technique includes receiving a listing from a first user, determining a first plurality of social network relationship factors for the first user with respect to a first plurality of users, and determining a second plurality of users from the first plurality of users who fulfill a filtering criteria, wherein a third plurality of users from the first plurality of users do not fulfill the filtering criteria. Additional techniques include making the listing available to users from the second plurality of users but not the third plurality of users, and providing the listing to a second user from the second plurality of users.

According to another aspect of the invention, a computer system computer system is disclosed. One apparatus includes memory configured to store relationships between a first plurality of users. Another system includes a processor coupled to the memory wherein the processor is configured to receive a first classified advertisement listing from a first user, wherein the processor is configured to determine a social network criteria, wherein the processor is configured to determine a second plurality of users from the first plurality of users who fulfill the social network criteria, wherein the processor is configured to provide the first classified advertisement listing to users from the second plurality of users, wherein the processor is configured to suppress the first classified advertisement listing from users from a third plurality of users from the first plurality of users who do not fulfill the social network criteria.

According to yet another aspect of the invention, a computer program product for a computer system including a processor is disclosed. One computer program product includes code that directs the processor to determine an advertisement listing from a first user, code that directs the processor to determine a first plurality of social network relationship factors for the first user with respect to a first plurality of users, and code that directs the processor to determine a second plurality of users from the first plurality of users who fulfill a filtering criteria, wherein a third plurality of users from the first plurality of users do not fulfill the filtering criteria. Other computer program product may include code that directs the processor to determine requests for advertisement listings from users from the first plurality of users, and code that directs the processor to provide the advertisement listing to the users from the second plurality of users in response to the requests, but not to users from the third plurality of users in response to the requests. The codes may reside on a tangible media such as a optical media (e.g. CD, DVD), magnetic media (e.g. hard disk), semiconductor media (e.g. RAM), or the like.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE INVENTION

Figure 1:
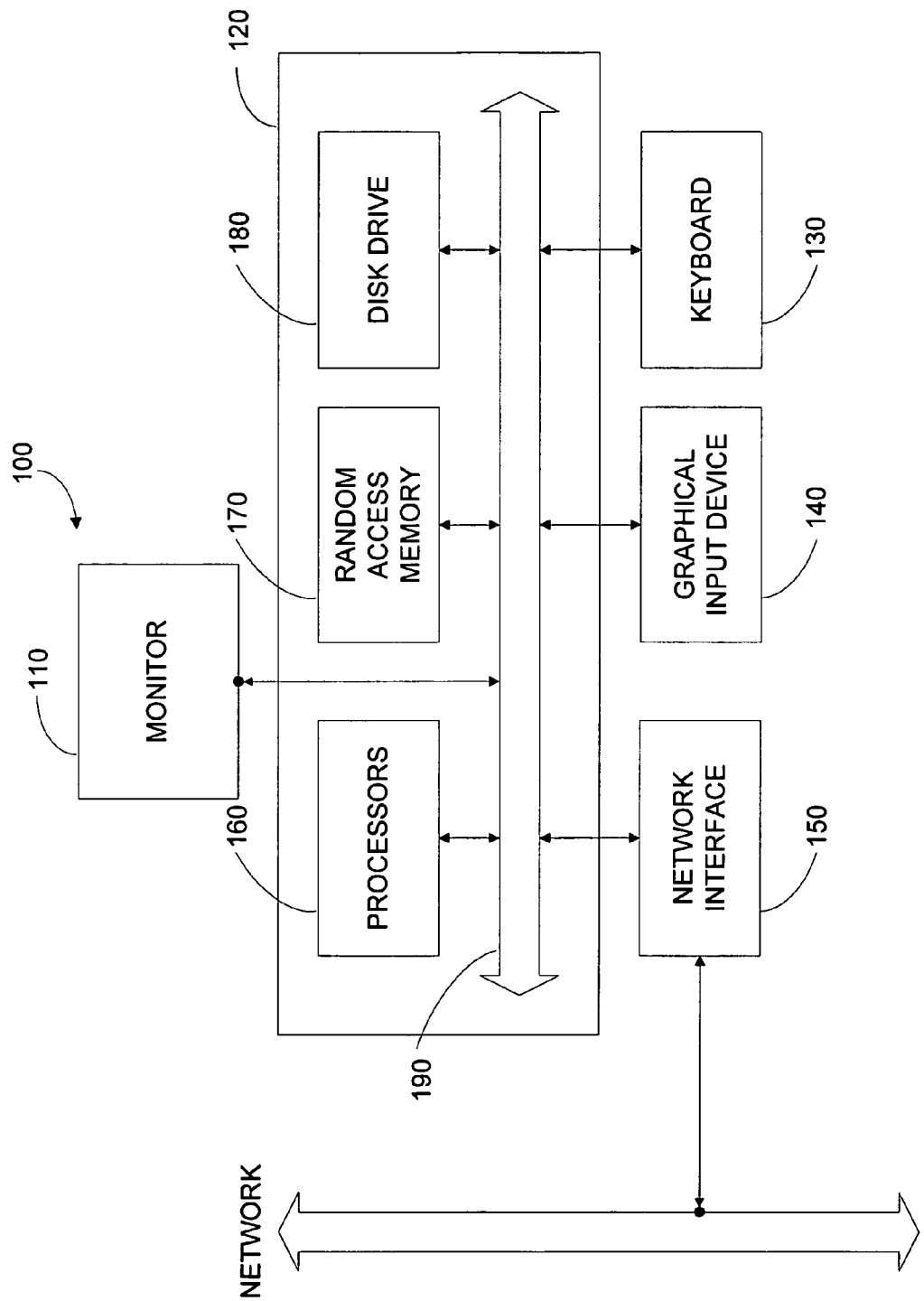
FIG. 1 illustrates a block diagram according to an embodiment of the present invention.

The following definitions are used in the present application to describe embodiments of trust-metric networks. That is, networks of users (e.g. persons, businesses) that have relationships between them that specify or imply a measure of trust or bond between users. The following terms are particularly relevant for social network embodiments.

Classified Listing—An offering for goods, services, job openings, open auctions, or the like typically originated by an individual user, an organization, or the like. The offerings are typically classified according to a hierarchy.

Home page—Typically the first page presented to a user when the user logs into the social network. Home pages may or may not be customized for each user.

People Card—A profile page associated with a user. A profile page typically includes a description of information provided by the user and retrievable by other users/viewers. This may include a name, contact information, a list of immediate friends, a list of interests, a list of affinity groups the user is a member of, job title, employer, and the like. In embodiments of the present invention, the amount of information displayed to a user/viewer may vary according to any number of parameters. Users may, for example specify the amount of user information viewable to other users depending upon metrics between the user and the other users. As examples, the user may provide a first e-mail address to users at a close social distance (defined below) (e.g. 1), and a second e-mail address to users farther away; the user may provide their full name to users less than a social distance of 2.0, but only their first name to other users; the user may allow users closer than a social distance of 3.2, to view a photo album, but the photo album is hidden to distant users; and the like.

In the various embodiments, users may have full control of what type of information they provide, according to their relationships in the social network. In some embodiments, there is a default relationship between the type of information provided about a user with respect to their relationships (e.g. social distance). The default relationships may be overridden by the user.

In various embodiments, users may have one or more profiles, for example, a profile for an alumni affinity group, a profile for their business, a profile for close friends. In various embodiments, different profiles may include different types of information about the user.

Degrees of Social Separation—A value defined as immediate friends (or acquaintances) of a user being a first degree; friends of the user's immediate friends being a second degree; etc. Degrees of Social Separation may also be computed relative to affinity groups, with members of the same affinity group being a first degree; members of directly related affinity groups being a second degree; etc. Degrees of social separation may also refer to a combination of relationships or ties between friends and relationships or ties between members of affinity groups.

In various embodiments, the degree of social separation between different users may be different depending upon which metric for separation distances are used, and depending upon the context in which the separation distance is to be used. Additionally, users may have different social separations for different user profiles. For example, two users may have a large social separation when considering personal profiles, but a small social separation when considering membership profiles in affinity groups. In some embodiments, the social distance may be the shortest distance between a first user and a second user.

Social distance—A numeric value associated with the Degrees of Social Separation between a first user and a second user. In embodiments of the present invention, a smaller social distance between users represents a higher "trust" level between the users. For example, in many cases, a user will trust her immediate friends (social distance=1); however, a user will trust a friend of her immediate friend (social distance=2) to a smaller degree; and a user will trust a friend of a friend of her immediate friend (social distance=3) even less;

and so on. In various embodiments, social distance need not be an integral value and may be a floating point number, for example social distance=4.2, social distance=1.5, etc. In such embodiments, other weighting factors other than mere degree of social separation may be considered, such as "importance" of the relationships between the users, the frequency of communications between the users, the quality of business relationship between the users, and the like. Other types of "fuzzy" weighting factors may include frequency of communication between users, common posts to similar forums, and the like, as will be described below.

In embodiments of the present invention, social distance may be symmetric or asymmetric numbers. As an example of this, a social distance between user A and user B may be the same (e.g. 1.4), when both user A and user B value their relationship the same. However, if user A values the relationship more than user B, the social distance from user B to user A may be smaller (e.g. 1.3) than from user A to user B (e.g. 1.8). Some of the factors described above may be used to determine weighting of the relationships, including user satisfaction of prior interactions, responsiveness to correspondences or queries, performance, common interests, common posting forum, a "frequency" factor, and the like.

In various embodiments, frequency factors may be based upon the number (or percentage) of contacts between two users. For example, the more frequently the two users exchange messages, the more heavily weighted is the frequency factor for the two users. These frequency factors may result in non-integer social distances. In various embodiments, an assumption is made that users who communicate frequently may be closer better friends. For example, user A has a social distance of 1.3 from user B, and user B frequently communicates with user C, but not user D. Accordingly, in one embodiment, the computed social distance between user A and user C may be 1.9 which would be smaller than the social distance between user A and user D which may be 2.4.

As is described in the above-referenced provisional application, in embodiments of the present invention, the social map of a user may be computed in real time or near real-time, when the user logs into the social network.

In various embodiments, relationship weighting factors may be manually entered by the user. For example, user A may rate a concluded transaction between user A and user B; user B may rate the timeliness of user A payment speed; and the like. In alternative embodiments, the relationship weighting factors may automatically be determined. For example, the frequency of communications between users may indicate a more valued relationship between the users, accordingly, the social distance between users may be shortened. In other examples, the more frequently two users post messages to an affinity group forum or post messages on the same thread in the forum, the higher their weighting factor relative to each other. In such embodiments automatically increasing weighting factors between the users is useful because it infers that users have shared interests. Other types of inferences based on user behavior are contemplated in other embodiments.

In other embodiments, users can decrease their social distance to other users by their own actions. For example, by quickly responding to e-mail messages, or other communications, responsiveness weighting factor of a user may be increased; as another example, frequency of checking e-mail messages or logging into the social network, or the like may increase a responsiveness factor. As an example, if a user runs a business using the social network, by increasing her quality of service, and client satisfaction, her reputation factor may increase. Accordingly, social distances of users relative to the business in the social network may automatically decrease, because of her increased reputation.

Tribe—An affinity group. One example is similar to a Usenet group, having a user moderator, user participants, discussion forums, etc; whereas in other examples, an affinity group need not have a moderator, leader, or the like. In embodiments of the present invention, two users may be connected in the social network by being members of the same affinity group, even though the two users may otherwise have a large social distance between them.

In various embodiments of the present invention, Tribe membership may be explicitly defined or implicitly defined. Accordingly, Implied Tribes may be determined. These tribes are groupings of users based on a common interest, common activity, or any other type of trait held by two or more users, without an explicit definition. Examples of implied tribes may include users who list a common interest, such as "skiing," users who view a particular classified listing, restaurant review, or the like.

In some embodiments of the present invention, members of affinity groups or groups of users are logically organized as one user (super node). In such embodiments, relationships of members are collapsed and imputed to the affinity group. For example, a clique of three close friends may be considered a super node, for sake of simplicity when performing relationship computations. The relationships of the super node may include the relationships of its underlying users. For example, a ski Utah affinity group may have users A, B, and C, thus the ski Utah affinity group super node will have the affinity relationships of its users A, B, and C. Accordingly, affinity groups can have social distances from other affinity groups. In another example, the ski Utah affinity group will combine the personal relationships of its users A, B, and C. In various embodiments, for this example, the ski Utah affinity group will list both the ski Utah affinity group relationships and the ski Utah affinity group personal relationships side-by-side. These relationships may be represented by a graph, or as desired. In other embodiments, the relationships of the affinity group are expanded and imputed back to the members of the affinity group.

Tribe Mapping—A process of determining a bottom-up taxonomy for related tribes based on common user membership overlap. These maps may be computed based upon explicit tribe membership data, or implicit tribe membership, as described above. For example, if 75% of the users in a bird-watching tribe also view classified listings on spotting scopes, a tribe mapping may closely associate the bird-watching tribe with an implied spotting-scope tribe. As another example, a "San Francisco Wine Drinker" tribe will most likely have a significant overlap with a "San Francisco" tribe, and a "Wine Drinker" tribe. This mapping can be performed automatically through algorithms that compute similarity, or manually by moderators of the tribes, who explicitly state their relationship. Accordingly, overlap of affinity groups may be explicit or implicit. The relationship between tribes can then be used as part of a social network filter or affinity filter criteria, described further below.

User Network—A subset of all users on the social network. In embodiments of the present invention, a User Network may be socially limited to a specified social distance from the user and/or by affinity groups which the user is a member of. For example, a user network may include all users within a social distance (or affinity distance) of 3.5.

In other embodiments, the user network may constrain the type of information available to the user. As examples, users may be constrained to searching for information (e.g. job posts) from users only within their user network; users may be limited to sending e-mails or invitations, or chatting only with other users in their user network. Many other restrictions can be envisioned to be placed on users based upon their relationships in the social network.

Social Map—A map of connections to other users on the system. The Social map typically includes a shortest path between two users, either via friendship, affinity group, or the like. The social map is typically socially limited to a specified social distance from the user. In embodiments of the present invention, the limited distance may be specified by an administrator, the user, or the like.

Social Network—A network of relationships between users (via friendship, affinity, or the like).

People Web—A unified collection of social networks into a complete social map. Unifying identities across social networks allows one to traverse the social map in a way similar to DNS for network traffic.

FIG. 1 is a block diagram of typical computer system 100 according to an embodiment of the present invention.

In the present embodiment, computer system 100 typically includes a monitor 110, computer 120, a keyboard 130, a user input device 140, a network interface 150, and the like.

In the present embodiment, user input device 140 is typically embodied as a computer mouse, a trackball, a track pad, wireless remote, and the like. User input device 140 typically allows a user to select objects, icons, text and the like that appear on the monitor 110.

Embodiments of network interface 150 typically include an Ethernet card, a modem (telephone, satellite, cable, ISDN), (asynchronous) digital subscriber line (DSL) unit, and the like. Network interface 150 are typically coupled to a computer network as shown. In other embodiments, network interface 150 may be physically integrated on the motherboard of computer 120, may be a software program, such as soft DSL, or the like.

Computer 120 typically includes familiar computer components such as a processor 160, and memory storage devices, such as a random access memory (RAM) 170, disk drives 180, and system bus 190 interconnecting the above components.

In one embodiment, computer 120 is a PC compatible computer having one or more microprocessors from Intel Corporation, or the like. Further, in the present embodiment, computer 120 typically includes a UNIX-based operating system.

RAM 170 and disk drive 180 are examples of tangible media for storage of data, audio/video files, computer programs, user profile card data, user social network-related data, social distance computation programs, hierarchal posting data, social network filtering criteria, other embodiments of the present invention and the like. Other types of tangible media include magnetic storage media such as floppy disks, hard disks, removable hard disks; optical storage media such as CD-ROMS, DVDs, bar codes, holographic; semiconductor memories such as flash memories, read-only-memories (ROMS), volatile memories; networked storage devices; and the like.

In the present embodiment, computer system 100 may also include software that enables communications over a network such as the HTTP, TCP/IP, RTP/RTSP protocols, and the like. In alternative embodiments of the present invention, other communications software and transfer protocols may also be used, for example IPX, UDP or the like.

FIG. 1 is representative of computer rendering systems capable of embodying the present invention. It will be readily apparent to one of ordinary skill in the art that many other hardware and software configurations are suitable for use with the present invention. For example, the use of other micro processors are contemplated, such as PentiumIV™ or Itanium™ microprocessors; AthlonXP™ microprocessors from Advanced Micro Devices, Inc; PowerPC G4™, G5™ microprocessors from Motorola, Inc.; and the like. Further, other types of operating systems are contemplated, such as Windows® operating systems (e.g. WindowsXP®, WindowsNT®, or the like) from Microsoft Corporation, Solaris from Sun Microsystems, LINUX, UNIX, MAC OS from Apple Computer Corporation, and the like.

Figure 2:
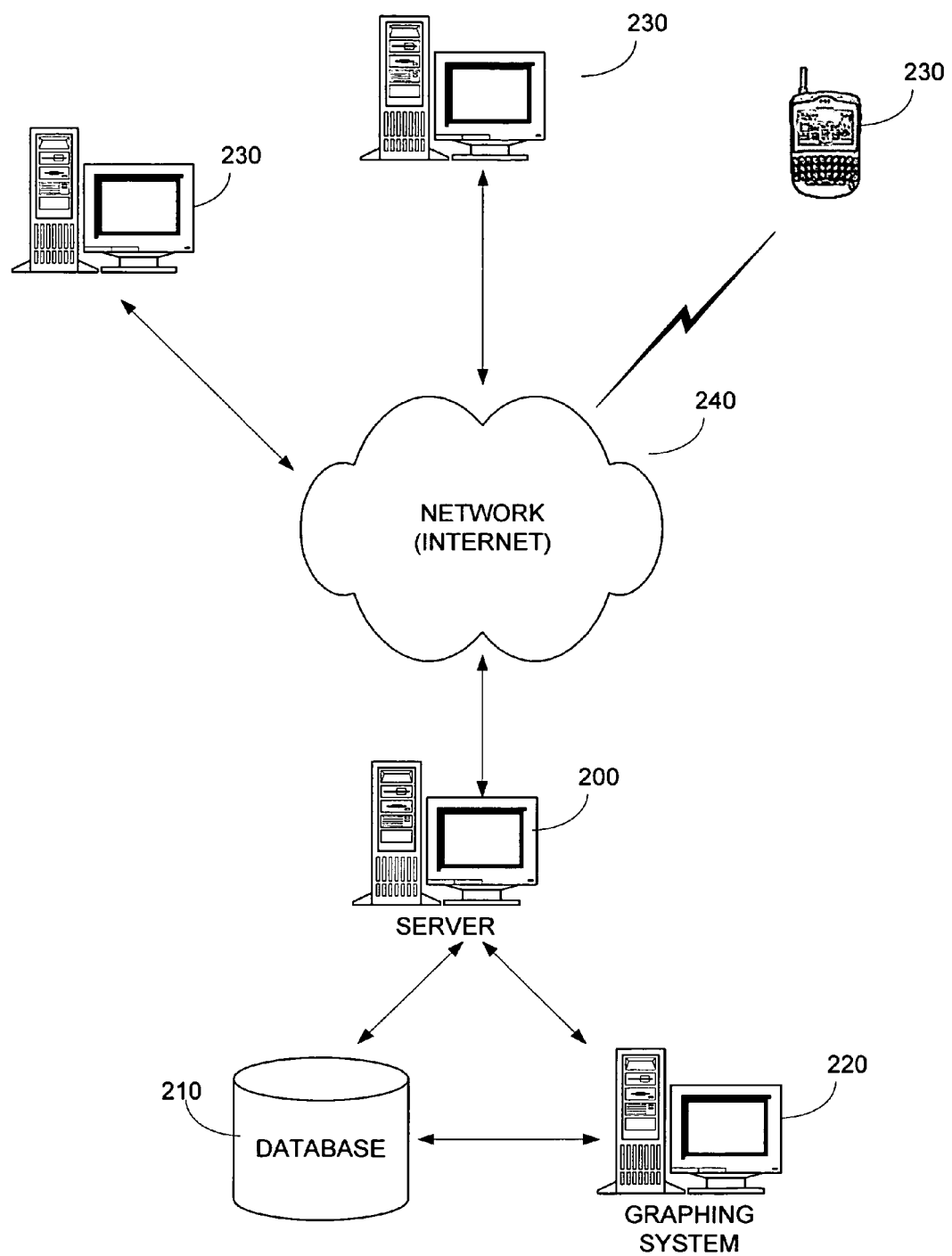
FIG. 2 illustrates another block diagram according to an embodiment of the present invention.

FIG. 2 illustrates another block diagram according to an embodiment of the present invention. FIG. 2 includes a server 200 coupled to a database 210 and coupled to a graphing system 220. A plurality of users 230 are coupled to server 200 via a network 240, such as the Internet.

In the present embodiments, users 230 may be any conventional access device, such as a computer, a web-enabled telephone, a personal digital assistant, or the like. In operation, users 230 log into server 200 and then makes one or more requests for data. The data that is returned is typically displayed back to user.

In various embodiments, server 200 may be embodied, as described above, and include one or more servers (e.g. server cluster) that respond to requests from users 230. For example, multiple servers may be used in embodiments where server performance is important, e.g. East Coast server for client requests from Boston, Midwest server for client requests from Chicago, and the like. Server 200 may be configured as illustrated in FIG. 1, above.

Database 210 may be any conventional database such as powered by MySQL, Oracle, Sybase, or the like. In other embodiments, database 210 may be any other data source such as an LDAP server, or the like. In the present embodiment, database 210 is configured to store and maintain user data, to store and maintain relationship data between the users, and configured to make changes to relationship data between users, among other functions. As illustrated, database 210 may be coupled to server 200 and to graphing system 220 to send and receive respective data, as will be described below.

In various embodiments, graphing system 220 is a stand-alone computer system configured to receive data from server 200, and configured to store and maintain relationship data between the users. Additionally, in various embodiments, graphing system 220 is configured to determine and provide requested relationship data to server 200. In various embodiments, graphing system 220 may be integrated as a part of server 200, or the like.

In various embodiments, graphing system 220 may be a conventional computer system, as described above. In one embodiment, graphing system 220 maintains in the relationship data of users (adjacency information) in RAM. In other embodiments of the present invention, graphing system 220 may store a portion of the relationship data of users in RAM. The other portions of the relationship data of users may be stored on magnetic disk or other media, on database 210, or the like. In such embodiments, elements of the relationship data of users can be loaded into a most recently used (MRU) queue.

In the present embodiment, graphing system 220 computes social relationships in real time by minimizing lookup time of required information. For example, lookup operations such as: who are the direct friends of person A?, who are the members of tribe B?, etc, are preformed in constant or near constant time. Additionally, graphing system 220 stores relationship data for users in RAM in a way that allows explicit control over memory allocation. In some embodiments of the present invention, it is expected that graphing system 220 will be able to compute social distance computations on a social network of up to 20 million users, within 20 milliseconds or less.

In embodiments of the present invention, graphing system 220 may include a number (e.g. cluster) of individual systems. In various embodiments, the individual systems may store unique portions of the relationship data of users; the individual systems may store in parallel the same portions (or the entire) relationship data of users; or the like. Any traditional data clustering technique may be used to implement graphing system 220 in embodiments of the present invention.

Additionally, in embodiments, graphing system 220 determines the specific relationships (e.g. social distance queries) primarily in RAM. With such a configuration, the performance of graphing system 220 has proven superior than disk-based computation systems such as conventional databases.

In various embodiments, graphing system 220 includes four software components including two C++ components, and two Java components. In other embodiments, other architectures are envisioned. The C++ components includes a portion that solves social distance queries using the RAM, utilizing a memory efficient graph implementation, as will be discussed below. Additionally, the C++ components includes a daemon process that reads commands and write results to a socket (or other transport medium). By having graphing system 220 respond to relationship queries via a socket, different implementations of the server interface, may be easily used, without touching the C++ components.

In various embodiments, the server interface, i.e. java components, includes a java class that provides APIs to requesting servers, such as server 200. The API's serve as the interface layer to the C++ components. Additionally, the java components includes an interface layer that sends requests to the socket and waits for relationship data on the socket.

In implementation, graphing system 220 may be multi-threaded and thus can support simultaneous requests from server 200. Additionally, in cases where server 200 includes one or more servers for increasing scale, standard clustering techniques such as data replication can be used to support simultaneous requests from one or more servers.

In various embodiments, many different types of relationship data can be determined by database 210 and graphing system 220 including, a shortest path between user A and user B (e.g. SOCIAL_DISTANCE (A,B)), typically a floating point value reflecting the distance from user A to B; shortest paths between user A and user B, for example through user C and user D, or through user E and user F (returned as an array of paths); what users are within or less than N degrees from user A (less than a N social distance); who is the most connected user in the social network, and the like. Many other types of information are reportable within other embodiments of the present invention. In embodiments of the present invention, database 210 and graphing system 220 may communicate with each other via custom function calls from database 210.

The relationship determined may be filtered and sorted in any number of conventional ways based upon various parameters. Additionally, database 210 and graphing system 220 are enabled to received up-dated relationship data, such as adding a new user/friendship relationship or removing a friendship relationship, and to recompute the relationship data, and the like.

Figure 3A:
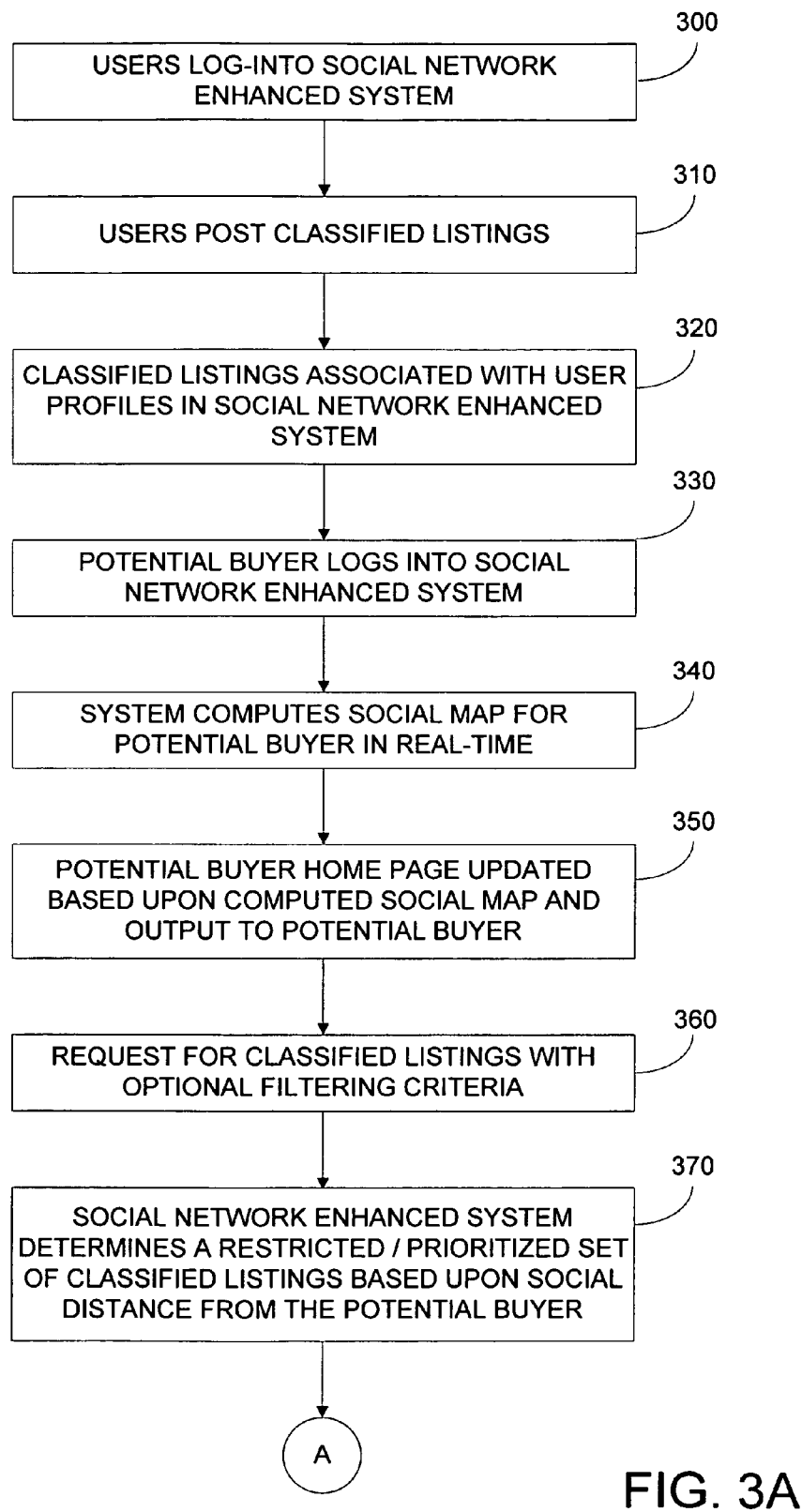
FIGS. 3A-B illustrate a block diagram of an embodiment of the present invention.
Figure 3B:
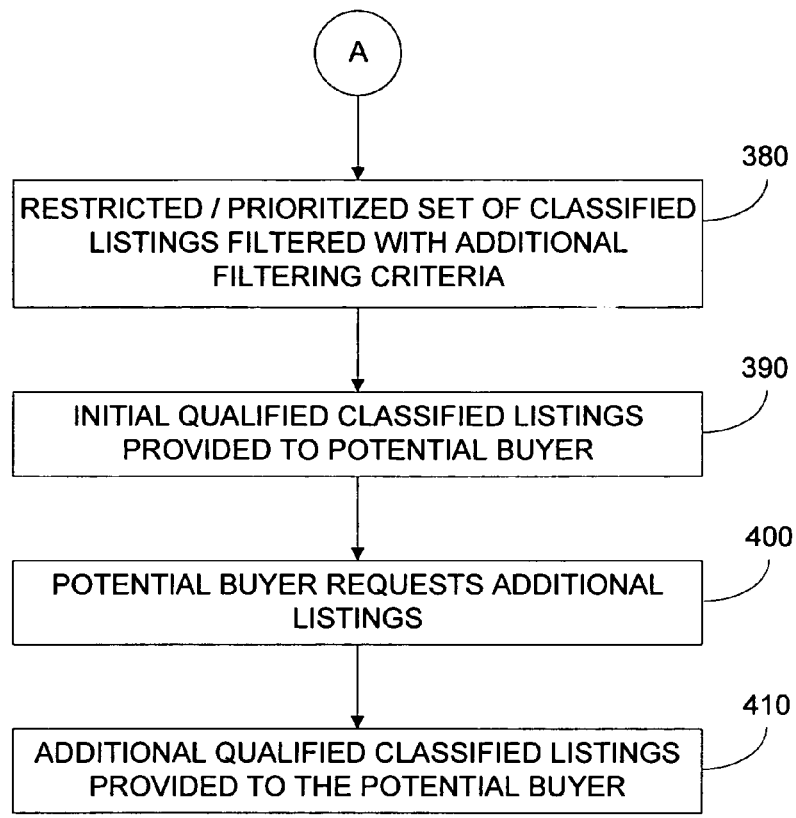

FIGS. 3A-B illustrate a flow chart according to an embodiment of the present invention. More specifically, FIGS. 3A-B illustrate a process of restricting display of postings by using trust-based metrics.

Initially, any number of users log into the social-network server 200, step 300. Such operations may be done with conventional user name/password combination, or any other level of security. As an option to the users, the users submit hierarchal posts, step 310. For example, in various embodiments, a first, a second, and a third user submit first, second, and third hierarchal posts to server 200, respectively. In various embodiments, a server, separate from server 200 may be used to receive the hierarchal posts. In various embodiments, hierarchal posts are typically classified listings, as discussed above, offering goods or services, listing job openings, listing auction entries, and the like. The posts are associated with the submitting users, and stored, step 320. In various embodiments, various memory pointers may be used to associate the poster with the post.

In various embodiments, the user must belong to the social network in order to view classified listings. This is desirable in order to expand the social network and to provide the values for the filtering criteria for the classified listings (e.g. geographic location, social distances). Subsequently, a user (e.g. buyer or potential buyer) logs into the social-network server 200, step 330. In response, in one embodiment, server 200, database 210 and graphing system 220, dynamically performs a social network calculation, and determines a social map for the buyer user, step 340. As discussed above, in various embodiments, the social map may include a limited number of users, typically users who are within a pre-determined social distance from the buyer. For example, the pre-determined social distance may be a number, such as 3.5, 2.0, or the like. In another embodiment, the social map may include a fixed number of users, such as 50 of the closest (via social distance) users. In still other embodiments, combinations of the above may be used. For example, a displayed list may include users within a social distance of 1.5 but limited to the first 20 or the closest 20. As discussed in the referenced application above, this calculation can be performed in real-time.

In the various embodiments, the potential buyer is automatically presented with their home page, step 350. The home page may include a set or sub-set of users (e.g. friends) in the social map, the on-line/off-line status of those friends, and the like. Other options/features on their home page may include adding/deleting members to a social network, adding/deleting affinity group memberships, changing the user's profile card, viewing recommendations, sending/receiving e-mail messages, and the like.

In various embodiments, the social map determined in step 340 may include users at a greater social distance than is presented to the user in step 340. For example, the social map may be determined to social distance of 8, however, on the user's home page, friends at a social distance of 2 or less are only displayed. As another example, the social map may include the 100 closest friends, however, on the user's home page, only the top 10 friends (i.e. 10 users with the smallest social distance) are displayed.

In one embodiment of the present invention, one option allows the buyer to request viewing classified advertisements, step 360. In such embodiments, any number of filters, described below may be entered by the buyer. In other embodiments, classified advertisements may be automatically requested for the buyer on their home page.

In one embodiment of the present invention, in response to the request, a restricted number of classified listings are retrieved from the whole classified list, step 370. In one embodiment, only the classified listings of users within the buyer's the social map are retrieved from memory. In another embodiment, classified listings of users less than a threshold social distance (e.g. 6) from the buyer are retrieved from memory. In yet another embodiment, classified listings of a predetermined number of closest users may be retrieved. In still other embodiments, classified listings may be based upon affinity group social distance.

In other embodiments, the restricted number of classified listings may exclude classified listings of users in the buyer's social map, and include classified listing of users outside the buyer's social map. Further, the classified listings of users within a determined social distance (e.g. 2) are excluded and classified listings of users greater than a determined social distance (e.g. 2) away are included. In yet another embodiment, classified listings of a predetermined number of closest users (e.g. 500) are excluded, and classified listings of users greater than the predetermined number (e.g. 500) of closest users are specifically included. Such embodiments are believed useful if the user wants to draw from "outside the box," for privacy concerns, or the like.

In various embodiments, additional filtering criteria may further narrow-down classified listings presented to the user, step 380. For example, other types of limitations may be used to filter-out classified listings, for example, geographic area of the poster, age of the poster, other demographics of the poster, family status of the poster, whether the poster is an individual or a group (e.g. company), and the like. In light of the present patent disclosure, it is believed that one of ordinary skill in the art would recognize that many different marketing criteria may be used as filters in embodiments of the present invention. These filters may be pre-specified by users in some embodiments, or in other embodiments, default values for filters may be provided, which the user can override, or the like. In other embodiments, the user may be prompted for a selection of one or more selections in the classified listing hierarchy as a filter. For example, the user may navigate to "Help Wanted" listing sections, "Rentals" listing sections, "Sports Equipment" listing sections, and the like.

In other embodiments of the present invention, users may also search for classified listings based upon specified affinity groups. As an example, the user may specify searching for classified listings only within a particular affinity group, for example searching for "cards" for sale in a "performance magic" affinity group, but not searching in a "Yu-Gi-Oh" affinity group. In some cases, the affinity groups may be groups the user is a member of, however, in other cases, the user need not be a member of the affinity groups to view classified listings. In some embodiments, affinity groups may be organized in a hierarchy, accordingly, the social distance may be generated that specifies how far apart two affinity groups are. For example, a top-level affinity group may be "performance magic" and two lower-level affinity groups may be "coin magic," and "card magic." Similar to the above, the user may specify that she can see classified listings of affinity groups that are less than a particular affinity number away from a given affinity group.

In response to the specified filters, the restricted classified listings are filtered, resulting in customized classified listings being output to the user, step 390. As a result, classified listings that are relevant to the user (via filters) and from "trust-worthy" sources (e.g. users with low social distance from the user) are provided. Further, classified listings from less known sources (e.g. users with higher social distance from the user) are not provided at the same time, in various embodiments.

In another embodiment, classified listings are automatically prioritized and placed into a series of directories by the system. In this embodiment, each directory may be associated with one or more social distance from the user. For example, one directory includes classified listings on closer friends (social distance=1-2); one directory includes classified listings of intermediate friends (e.g. friends of closer friends, social distance=2-4); and the like. In such embodiments, a user/buyer can easily select the classified listing directory she is most comfortable with to view. For example, classified listings from closer friends may automatically be provided to the buyer. Additionally, if the user wants to go beyond this group, the user may select one or more directories that store classified listings for intermediate friends, or further, step 400. In response, classified listings of such users are then provided, step 410.

In other embodiments, classified listings are automatically placed into another series of directories by the system based upon affinity group membership. Accordingly, a user/buyer can select directories of affinity groups the user is a member of, or an affinity group the user is not member of, but may be relevant to what is being sought by the user. In various embodiments, affinity groups may have a hierarchal organization, accordingly, particular affinity groups may be more closely related to each other than two randomly selected affinity groups. In such cases, the affinity groups that are more closely related may be higher-up in the classified listing directory hierarchy presented to the user.

In various embodiments of the present invention, fees could be charged for access to certain classified listings. For example, certain affinity groups may charge users to view classified listings, archived listings, or the like. As an example, an affinity group may be similar to a "buying club" and have fees for members to join or to view particular listings. In another example, the affinity group may be a company, and subscription fees are required for listings of latest product versions and download links, and the like. In such cases, such listings may be placed in a folder that is indicated as a "premium" service, or the like to the user. Fees may also be required for automatic classified listing monitoring for particular goods, services, jobs, auctions, or the like.

The inventors of the present invention, believe this combination of classified listings in combination with social network filtering enhances the parties to trust each other for the transaction because they are friends of friends, and not total strangers. Accordingly, a larger number of communications between the parties are expected to take place and a larger number of completed transactions are expected using embodiments of the present invention. Based upon current test data, these expectations have proven true—the effectiveness of classified listings for connecting two parties has dramatically increased.

Figure 4A:
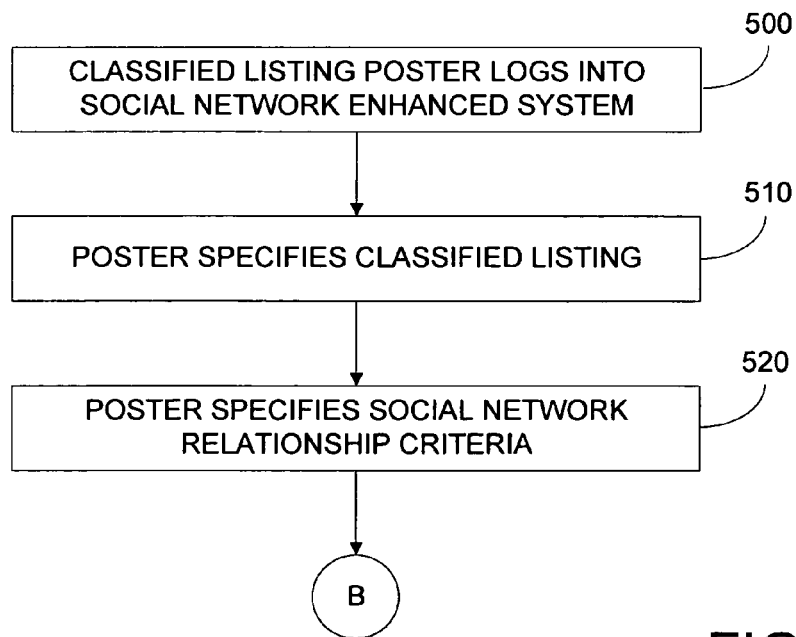
FIGS. 4A-B illustrate another block diagram of an embodiment of the present invention.
Figure 4B:
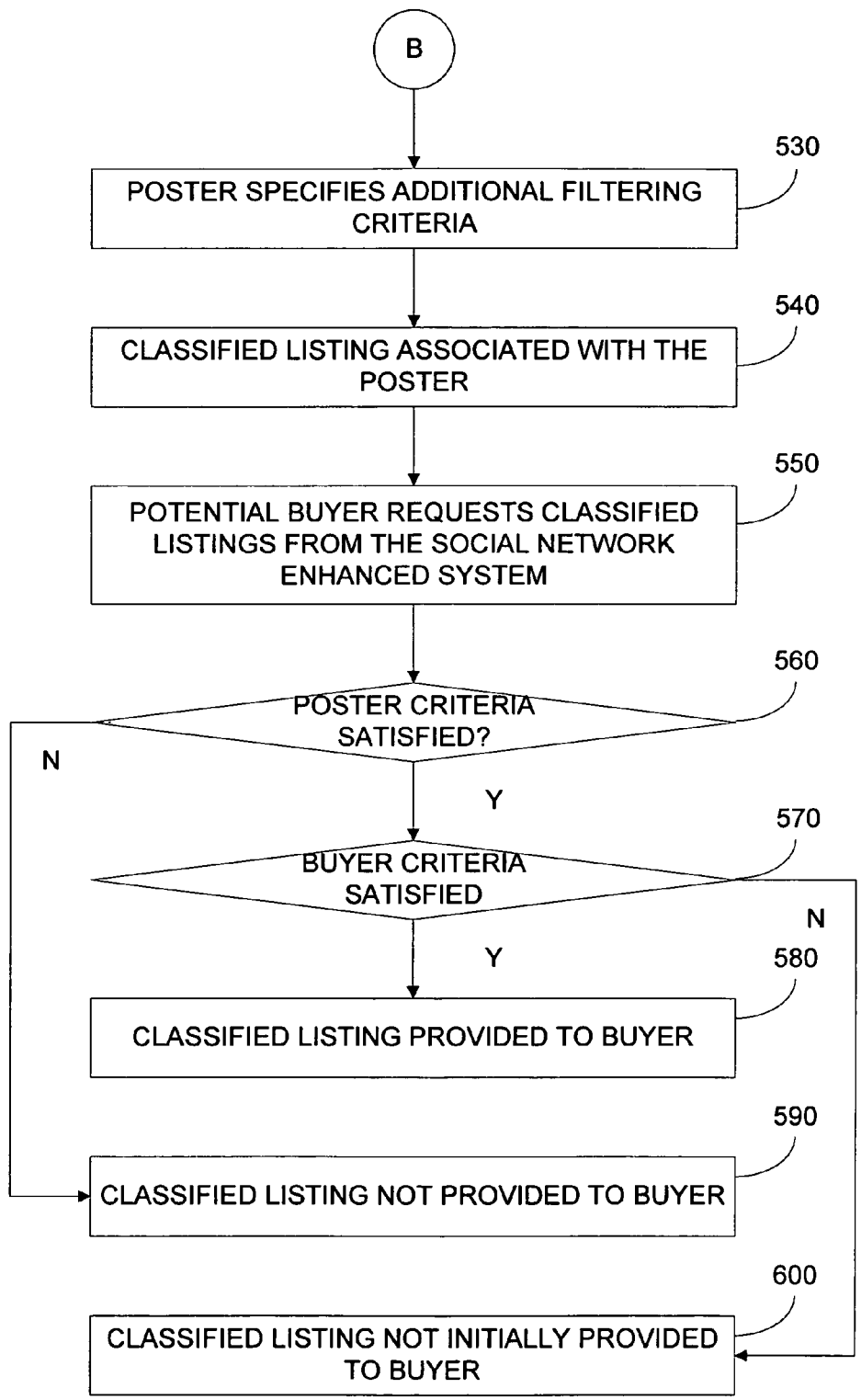

FIGS. 4A-B illustrate a flow chart according to an embodiment of the present invention. More specifically, FIGS. 4A-B illustrate a process of a poster restricting display of postings using trust-based metrics.

In embodiments of the present invention, different ways to restrict the posting of classified listings are disclosed. For example, as will be described below, users who post classified listings may also leverage the relationships of the social network to target users based upon social distance.

Initially, a users logs into the social-network server 200, step 500. Such operations may be done with conventional user name/password combination, or any other level of security. As an option to the users, the users submit hierarchal posts, step 510. In various embodiments, a server, separate from server 200 may be used to receive the hierarchal posts. In various embodiments, hierarchal posts are again classified listings, as discussed above, offering goods or services, listing job openings, listing auction entries, and the like.

In embodiments of the present invention, users who post classified listings may also specify posting criteria for the listing based upon relationships defined in the social network, step 520. In one embodiment, the user/poster specifies a maximum social distance away (from the user) where the classified listing can be displayed. Accordingly, users who are within the maximum social distance are allowed to view a user's classified listing, whereas users who are outside the maximum social distance are not allowed to view the user's classified listing. For example, a user may specify that an automobile for sale will be available only to users that have a social distance of three or less. Such embodiments are believed beneficial to the poster, because users within the specified social distance are typically considered more trustworthy than other users. That is, potential buyers with a small social distance are normally less likely to defraud the poster, in part due to the potential buyer's reputation in the social network.

In other embodiments of the present invention, users who post classified listings may specify only posting to users within a specified tribe or affinity group or closely related one. Accordingly, users who are members of the tribe are allowed to view a user's classified listing, whereas users outside the tribe are not allowed to view the user's classified listing. For example, a user may specify that the classified listing will be available to users in a "Magic Performance" tribe, or the like. These embodiments are believed beneficial to the poster, because if the listing is relevant to the tribe, it is more likely that users of that tribe will respond. Additionally, by limiting the reach of the classified listing (audience), it is less likely that the poster will be accused of "spamming" others in the social network.

In other embodiments of the present invention, the poster may specify other types of limitations may be also used to limit or target a classified listing, for example, geographic area (e.g. San Francisco Bay Area, Boston Area, 50 miles from Chicago), age, demographic (e.g. male, female, income, home owner), family status (e.g. married, divorced, married with children), and the like, step 530. In light of the present patent disclosure, it is believed that one of ordinary skill in the art would recognize that many different marketing criteria may be applied to embodiments of the present invention.

In other embodiments, the viewer may, in addition, or alternatively to above, specify that classified listings closer than a minimum social distance away are not potentially viewable. For example, a corporate user may want to get "fresh blood" into the organization, and thus post a help wanted advertisement to users greater than a social distance of 2 away; and at the same time, a user/job seeker may seek jobs outside their industry, thus only desire to view classified listings greater than a social distance of 3 away. Other similar situations are imaginable with respect to other types of limitations, such as geography, affinity group, and the like.

In various embodiments, fees may be charged to the posting user based upon social distance, affinity group, or the like. For example, for free, the user may make a classified listing be available to users a specified social distance of one away (i.e. immediate friends), members of the same affinity group as the user, users within a particular geographic area, and the like. If the user is willing to pay a fee, the user may make a classified listing be available to users outside the "free" posting area. For example, the classified listing may be posted for free to users within a social distance of three, but the classified listing may be posted to users within a social distance of up to six for a fee. In another example, for a fee, the classified listing may be presented to users, in a wider geographic area, to a larger number of related-affinity groups, and the like.

In additional embodiments, it is contemplated that viewers of classified listings may themselves may recommend or forward classified listings to other users. For example, a first user may view a classified listing for a job and forward the listing to a second user who may be looking for a job. The second user may also forward the classified listing to another user, and so on. In embodiments of the present invention, limits may be applied to whom a user may forward classified listings to, to avoid "spam" problems with mass forwarding of classified listings. As an example, viewers of classified advertisements may be limited to forwarding classified listings to users of a social distance of one, two or the like away.

In addition, in some embodiments, classified listing users may limit the forwarding of their classified listings to other users. For example, a poster may specify that the classified listing is available to users closer than a social distance of 2.5, and that the classified listing can be forwarded only to users closer than a social distance of 4, or the like. Additionally, from a receiving end, the users who received the forwarded classified listing may decide to filter-out the forwarded or recommended classified listings from users greater than a specified social distance away (e.g. three or greater.)

In other embodiments, a poster may compensate or pay fees for viewers to forward classified advertisements to other users. For example, a poster may post a job listing, and a first viewer may view the job listing and forward it to a second viewer. If the second user is fit for the job and hired, the poster may pay a referral fee to B. This process may be termed "Pay It Forward" enables bounties to be paid to participants in the communication chain leading to fulfillment of the classified advertisement. Embodiments may be paid for a product being sold, a person being hired, an apartment being rented, or the like. In other embodiments, simply forwarding the advertisement to another user itself may trigger some sort of compensation. Types of compensation can include monetary payment, user access to protected content (e.g. articles, music, film clips), coupons, membership, or the like.

In various embodiments of the present invention, the classified advertisement along with the desired social network filtering criteria, as well as additional filtering criteria are stored and associated with the poster, step 540.

In various embodiments, when a subsequent user requests classified listings, step 550, the system determines when the social network criteria, the filtering criteria, and/or the forwarding limitations of the poster are satisfied, step 560. If not, the listing is not provided to the subsequent user, step 590.

In various embodiments, the system then determines whether the classified listing meets the subsequent viewer's social network criteria, filtering criteria, as was described above, step 570. If so, the classified listing may be provided to the viewer, step 580. As can be seen, criteria of the poster and criteria of the viewer should be satisfied before the viewer can see the classified listing. As examples, a poster may post a job listing for a programmer to users within a social distance of three, with a forwarding maximum social distance of five. Further, a job hunter may look for programming jobs from posters a maximum social distance of two away. If a social distance from the poster to the viewer is four, the viewer may not see the job listing unless it is forwarded to her; if the social distance from the viewer to the poster is three, the viewer may not see the job listing; if the social distance from the poster to the viewer is three, and the social distance from the viewer to the poster is two, the viewer may see the job listing; and the like.

In the illustrated example, if the viewer's criteria are not met, the classified listing is not initially provided to the viewer, step 600, but is placed in a lower priority folder. The viewer may request to view the listing at a later time.

In additional embodiments, advertisements or classified listings can be specifically targeted by posters to viewers or affinity groups based upon demographic criteria, affinity data, and the like. Similarly, viewers can explicitly state the types of specific advertisements they are receptive to receiving, by specifying an interest, joining a group or affinity group relevant to the specific advertisements. The combination of these features allows advertisers to target highly relevant classified listings to receptive viewers.

In embodiments of the present invention, combining advertisement targeting with "Tribe Mapping," discussed above, it is believed that posters can more easily determine potentially interested viewers. For example, a poster is trying to present advertisements to 10,000 wine enthusiasts, however the Wine Tribe includes only 1,000 users. In this case, by finding closely related tribes to the Wine Tribe, based upon user membership, the remaining 9,000 users may be identified. For example, closely related tribes could include a "Gourmet Food Tribe," "Resort Living Tribe," and the like. Although not all members of the related tribes may be interested in wine, by providing such advertisements to related tribe members is believed to yield better results than random advertisement placement.

In additional embodiments of the present invention, additional filtering factors may be used, in step 380 and 530, above. In various embodiments, "reliability," "feedback," "reputation," "star rating" factors, or the like may be specified. These reliability factors may be based on any number of criteria, such as reliability in responding to questions, in delivery of goods or services, in quality of services, in timeliness of response, in satisfaction, in length of membership, amount of time in business, forum participation and behavior, and the like. These reliability factors, alone, are often not trusted by viewers. The inventors believe this is because viewers do not know whether the opinions are trustworthy or not (i.e. ratings by shills). Accordingly, the addition of social network criteria help provide the viewer with a trust-metric to enable them to make more informed decisions. Because each buyer has their own unique social map, the social distances of the raters of a merchant or seller, tend to be unique.

In various embodiments, the trust-metric (e.g. social distance) may be a value that is independently presented to the viewer, along with the rating value. In other embodiments, the trust-metric value and the rating value may be combined in any number of ways to provide a single value. For example, the single value may be a simple average of the rating and trust-metric value, a weighted combination, a non-linear combination, or the like.

As examples of embodiments of the present invention, an implementation of the above social networking overlay could be implemented in conjunction with e-commerce sites, such as an auction site such as ebay.com, amazon.com, or the like. In such embodiments, reliability of the buyers and sellers can be adjudged based upon feedback from prior sellers and buyers, respectively, and now also based upon 1) social distance of the raters and/or 2) social distance of the buyer or seller in question. As examples of the first case, a buyer may be inclined to buy from a small, high-rated seller with raters at a social distance of 2.1 away rather than a higher-rated seller with raters at a social distance of 6.4 away; a buyer may be inclined to buy from a highly-rated seller with raters at a social distance of 3.2 away at a higher price than a higher-rated seller with raters at a social distance of 4.5 away; or the like. As examples of the second case, a first seller is at a social distance of 2 from a potential buyer, and a second seller is at a social distance of 3 from a potential buyer. If the first seller has a 4 star rating, and the second seller has a 3 star rating, the first seller will be ranked ahead of the second seller; if the first seller has a 2 star rating, and the seller has a 4 star rating, the second seller may be ranked ahead of the first seller; and if the first seller has a 3 star rating, and the seller has a 3 star rating, the first seller may be ranked ahead of the second seller; or the like.

An another example, trust-metric data could be used in conjunction with recommendation sites, such as epinions.com, zagat.com, aaa.com, or the like. In some embodiments, the trust-metrics may be the social distance of users who rate product quality, restaurants, hotels, airlines, and the like. As examples, a user may prefer to buy a product with a three star rating rated by others at a social distance of 2.1 rather than a product with a three and a half star rating rated by others at a social distance of 3.5; a user may prefer to see a movie with four "thumbs-up" rating by others at a social distance of 4.2 rather than a movie with three "thumbs-up" rating by others at a social distance of 1.5; and the like. In various embodiments, one way to present such results is by stating users within a first social distance (e.g. 1-2) rate this product with X stars (e.g. 4 stars); users within a second social distance (e.g. 2-3) rate this product with Y stars (e.g. 3.5 stars); users within a third social distance (e.g. 3-6) rate this product with Z stars (e.g. 3.3 stars).

In various embodiments of the present invention, a user's profile can be augmented by data that is available on other social networks and portals. Reliability or trust of the user can thus be obtained from a number of domains. For example, a user may have an excellent forum rating because of the user's timeliness and usefulness of postings. This information can be used in the context of classified listings. For example, a potential buyer may base their buying decision on the user's forum reputation, as a proxy for the classified listing reputation. The inventors believe this solution solves a problem with seller ratings on sites such as e-Bay, because sellers with little transaction history are at a disadvantage compared to e-Bay volume sellers (e.g. businesses.) Accordingly, using a proxy for trustworthiness provides a level playing-field for individuals to penetrate such "power law" reputation networks (where power becomes more concentrated in the first movers).

In various embodiments, data from other domains may be imported or linked to the user's profile. As an example, a user's e-Bay seller rating may be made available on her profile by either importing that value, or by an external link to such content. This aggregation of social information from a collection of separate locations can give others a better idea of the user's social standing. For example, the data may include tribe membership, interests, blog posts, forum ratings, seller ratings, buyer ratings, philanthropic donations, memberships in external organizations (e.g. WWF, IEEE, Mensa), and other external content (e.g. Amazon Wishlist). In various embodiments, a reliability rating of a buyer or seller in a classified listing context may thus be determined upon the user's, e-bay seller rating, Amazon seller rating, e-pinions forum reputation, and the like.

In embodiments of the present invention, another novel concept is that the relationship data of users stored in the social network may be exported to many different applications, such as genealogy, organization history, leadership charts, or the like. Further, the user relationship data may also be exported to different social networks, or the like. In other embodiments of the present invention, the user relational data may be imported into social networks, such as customer lists, or other application or service that stores identity information. In general, the user's profile and social relationships can be distilled into a flat file outside of the social network, portal, or the like, that can be "carried around" by the user and can be controlled by the user. Additionally, embodiments allow the user to unify aspects of the user's identity in one or more files in a single location, whereas previously, the user's identity was distributed in multiple locations, such as yahoo!, eBay, or the like. In one embodiment, the user's profile is described in a format termed FOAF (Friend of a Friend), a flat XML document, including RDF descriptions of ontologies.

In other embodiments of the present invention, other types of data other than classified listings or posts may be restricted or prioritized based upon trust-metric criteria. In one example, the social networking factors could be implemented in conjunction with search engines such as Yahoo, Google, MSN search, and the like. In some embodiments, clicks on links by previous users may be combined with the trust-metric values to determine a priority for search results. For example, a first user is a member of an affinity group such as an "toy airplane affinity group," and a second user is a member of a "fashion affinity group." If the first user searches for the terms "model" and "photography," the search engine may initially identify a number of search result links. Subsequently, based upon selected search result links of other members in the same "toy airplane affinity group," the search engine will promote links about "hobby supplies," "macro photography," "aviation" and the like, for the first user. In contrast, if the second user searches for the same terms "model" and "photography," the search engine may again identify the same number of search result links. However, based upon selected search result links of other members in the "fashion affinity group," the search engine may promote links about "photographic supplies," "fashion models," "weight loss supplements" and the like, for the second user.

As another example, a search engine may prioritize results based upon prior searches performed by users closer than a determined distance away from the user. For example, a college student may search for "airlines" and "hotels." In such embodiments, the search engine may identify potential links to return to the student, then, based upon searches performed by users less than a social distance of two away, for example, the college student's results may be prioritized. If many of the student's friends are planning trips to Ft. Lauderdale, the search results may prioritize links describing "Spring Break packages to Florida," "Miami nightlife guides" "tanning salons" and the like.

In light of the present disclosure, one of ordinary skill in the art will recognize that many other types of collaborative filtering techniques may be advantageously adapted with the trust-metric factors described above.

In other embodiments of the present invention, users need not log into the social network, but instead may receive classified listings through subscriptions to listing feeds via RSS, or the like. Other methods for syndication of listings to other networks and providers are contemplated, for example cell phone networks, PDA and/or pager networks, and the like. As other examples, embodiments may be applied to peer to peer classified listings where feeds, subscriptions, and queries flow through a chat or P2P clients without a portal in the middle. In such embodiments, users may specify one or more subscriptions that include a persistent search via RSS, subscriptions that monitor one or more channels for any data, or the like. In response, when the one or more feeds include data satisfying the search, or when data is posted on the channel, the respective data is provided to the user. For example, a user may specify a search such as, "apartments in Mountain View" which searches a real-estate feed, or may specify monitoring a channel titled "Mountain View apartments."

Generally, embodiments allow for portal-less communication and commerce transactions from device to device, or peer to peer, without having to visit an intervening portal. In such embodiments, users may post classified listings to the "network of listening devices" and users may view classified listings with a "listening device" both without central portal (e.g. Craigslist.org, ebay.com).

In various embodiments of the present invention, any combination of the above techniques is contemplated. Further, in embodiments, the results displayed to the user may be non-prioritized, or may be prioritized based upon the filtering criteria. For example, classified listings may simultaneously be presented to a user/viewer via folders or via position in a hierarchy listing based upon social distance, based upon affinity, reliability, and the like. In various embodiments, when a social networking filter is applied to user recommendations (for example, users who are rating a service provider, such as a plumber), recommendations from a user's social network can be highlighted to the user. For example, if several friends have recommended the same plumber, that plumber may appear as a "recommendation from my social network" to the user. As another example, social network metrics, such as a social distance, and a poster rating may be used with or without using additional filtering criteria, for both posters and potential buyers. Accordingly, any of the above embodiments are not exclusive.

Embodiments of the present invention may be applied to any number of hierarchal posting/classified listing embodiments. For example, embodiments may be used in conjunction with any on-line shopping search system such as froogle.com, mysimon.com, or the like. In addition, embodiments may be used in conjunction with on-line shopping rating system such as epinions.com, bizrate.com, or the like. Embodiments may also be based upon brick-and-mortar shopping systems, such as registry services provided by stores, and the like. The above embodiments may also be applied to on-line merchants such as amazon.com, bn.com, overstock.com and the like. Additionally, as discussed above, embodiments may be applied to auction sites such as ebay.com, and the like. Accordingly, the concepts disclosed above are extremely valuable in a variety of applications, such as interactive "yellow pages" and directories of products and services (e.g. Thomas Register, Martindale-Hubbell), and the like.

In the embodiments disclosed above, and in the claims below, reference is made as to the trust relationships between two users, however, it should be understood that the trust relationships can span more than two users. For example, in value chains including multiple users, such as a seller, a value added reseller, and a buyer, the trust relationships of each party is important. This is even more significant for more complex value chains with multiple participants.

Further embodiments can be envisioned to one of ordinary skill in the art after reading this disclosure. In other embodiments, combinations or sub-combinations of the above disclosed invention can be advantageously made. The specification, accordingly, is to be regarded in an illustrative rather than a restrictive sense. It will, however, be evident that various modifications and changes may be made thereunto without departing from the broader spirit and scope of the invention as set forth in the claims.

What is claimed is:

1. A method to be executed by a computer system operating in a network environment in which Internet Protocol (IP) packets are exchanged, comprises:
   receiving a hierarchal post from a first user;
   receiving a filtering criteria associated with the hierarchal post from the first user;
   determining a first plurality of social network relationship factors for the first user with respect to a first plurality of users, wherein a first profile is provided for the first user and includes a first social distance between the first user and a second user, and wherein the first social distance is reduced between the first and second users as a result of a weighting factor that is determined by a frequency of communications between the first and second users, a responsiveness by the first user in answering communications from the second user, and by a manual adjustment made directly to the weighting factor by the first user;
   determining a second plurality of users in response to the first plurality of social network relationship factors, from the first plurality of users who fulfill the filtering criteria, wherein a third plurality of users from the first plurality of users do not fulfill the filtering criteria;
   making the hierarchal post available to users from the second plurality of users but not the third plurality of users; and
   providing the hierarchal post to the second user from the second plurality of users, wherein each of the posts are identified as having been submitted by an individual user, and wherein the hierarchal post is selected from a group consisting of classified listings, job listings, auction listings, listings of goods, listings of services, and listings of real estate.

2. The method of claim 1 wherein the first user comprises an entity selected from the group consisting of: an individual, a company, a partnership, a business, a group of individuals.

3. The method of claim 1 further comprising:
   determining a pre-determined filtering criteria;
   receiving a request from the first user to modify the pre-determined filtering criteria; and
   determining a second filtering criteria in response to the pre-determined filtering criteria and in response to the request.

4. The method of claim 3
   wherein a fourth plurality of users from the first plurality of users fulfill the pre-determined filtering criteria; and
   wherein a number of users in the second plurality of users is greater than a number of users in the fourth plurality of users.

5. The method of claim 1 wherein the first plurality of social network relationship factors comprise social distance values; and
   wherein the filtering criteria comprises a social distance value selected from a group consisting of a maximum social distance value, a minimum social distance value.

6. The method of claim 1 further comprising determining the first plurality of users from a fourth plurality of users who are within a set of social distance away from the first user.

7. A computer system comprises:
   a memory configured to store relationships between a first plurality of users; and
   a processor coupled to the memory wherein the processor is configured to receive a first classified advertisement listing from a first user, wherein the processor is configured to determine social distances from the first user to the first plurality of users, wherein the processor is configured to determine a social network criteria in response to input from the first user, the social network criteria dependent on the social distances from the first user to the first plurality of users, wherein a first profile is provided for the first user and includes a first social distance between the first user and a second user, and wherein the first social distance is reduced between the first and second users as a result of a weighting factor that is determined by a frequency of communications between the first and second users, a responsiveness by the first user in answering communications from the second user, and by a manual adjustment made directly to the weighting factor by the first user, wherein the processor is configured to determine a second plurality of users in response to the social distances, from the first plurality of users who fulfill the social network criteria, wherein the processor is configured to provide the first classified advertisement listing to users from the second plurality of users, wherein the processor is configured to suppress the first classified advertisement listing from users from a third plurality of users from the first plurality of users who do not fulfill the social network criteria, wherein each of the listings are identified as having been submitted by an individual user, and wherein the first classified advertisement listing from the first user is selected from a group of listings consisting of job listings, auction listings, listings of goods, listings of services, and listings of real estate.

8. The computer system of claim 7 wherein the first user comprises an entity selected from the group consisting of: an individual, a company, a partnership, a business, a group of individuals, an affinity group, a tribe.

9. The computer system of claim 8
   wherein the social network criteria comprises: a social distance in relationship to a modified social distance;
   wherein the processor is also configured to determine a pre-determined social distance;
   wherein the processor is also configured to receive a request from the first user to modify the pre-determined social distance; and
   wherein the processor is configured to determine the modified social distance in response to the pre-determined social distance and in response to the request.

10. The computer system of claim 6 wherein the relationship is selected from a group of relationships consisting of: less than, greater than, equal to.

11. The computer system of claim 10 wherein the processor is configured to determine social distances from the first user to the first plurality of users in response to the relationships between the first plurality of users.

12. The computer system of claim 7
   wherein the processor is also configured to receive a request from the second user from the third plurality of users; and
   wherein the processor is configured to provide the first classified advertisement listing to second user from the third plurality of users in response to the request.

13. A computer program product comprising a tangible media comprising executable code for a computer system including a processor includes:
   code that directs the processor to determine an advertisement listing from a first user;
   code that directs the processor to determine a first plurality of social network relationship factors for the first user with respect to a first plurality of users;
   code that directs the processor to determine a filtering criteria in response to input from the first user, the filtering criteria dependent on the first plurality of social network relationship factors;

code that directs the processor to determine a second plurality of users in response to the first plurality of social network relationship factors, from the first plurality of users who fulfill the filtering criteria, wherein a third plurality of users from the first plurality of users do not fulfill the filtering criteria, wherein a first profile is provided for the first user and includes a first social distance between the first user and a second user, and wherein the first social distance is reduced between the first and second users as a result of a weighting factor that is determined by a frequency of communications between the first and second users, a responsiveness by the first user in answering communications from the second user, and by a manual adjustment made directly to the weighting factor by the first user;

code that directs the processor to determine requests for advertisement listings from users from the first plurality of users; and code that directs the processor to provide the advertisement listing to users from the second plurality of users in response to the requests, but not to users from the third plurality of users in response to the requests, wherein each of the listings are identified as having been submitted by an individual user, and wherein the advertisement listing is selected from a group of listings consisting of: classified listings, job listings, goods listings, services listings, and auction listings;

wherein the codes reside on a tangible media.

14. The computer program product of claim 13 wherein the first plurality of social network relationship factors includes a plurality of social distances from the first user with respect to users from the first plurality of users;

wherein the filtering criteria includes a set social distance;

wherein the code that directs the processor to determine a second plurality of users from the first plurality comprises code that directs the processor to determine users from the first plurality of users that have a social distance in a relationship to the set social distance; and wherein the relationship is selected from a group of relationships consisting of: greater than, less than, equal to.

15. The computer program product of claim 14 further comprising:

code that directs the processor to determine the set social distance in response to input from the first user.

16. The computer program product of claim 14 wherein the first user comprises a group of users; and wherein the plurality of social distances from the first user with respect to users from the first plurality of users comprises a smallest social distance between users from the group of users to users from the first plurality of users.

17. The computer program product of claim 13 further comprising:

code that directs the processor to determine an advertisement listing from the second user;

code that directs the processor to determine a second plurality of social network relationship factors for the second user with respect to the first plurality of users;

code that directs the processor to determine a third plurality of users from the first plurality of users who fulfill another filtering criteria, wherein a fourth plurality of users from the first plurality of users do not fulfill the other filtering criteria;

code that directs the processor to determine requests for advertisement listings from users from the third plurality of users; and code that directs the processor to provide the advertisement listing to the users from the third plurality of users in response to the requests, but not to users from the fourth plurality of users in response to the requests;

wherein the second plurality of users and the third plurality of users are not identical.

* * * * *